United States Patent
Kato et al.

(10) Patent No.: US 7,855,809 B2
(45) Date of Patent: Dec. 21, 2010

(54) IMAGE PROCESSING APPARATUS AND METHOD FOR EXECUTING A PROCESS OF ERROR DIFFUSION

(75) Inventors: Masao Kato, Kanagawa (JP); Akitoshi Yamada, Kanagawa (JP); Mitsuhiro Ono, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1170 days.

(21) Appl. No.: 10/725,397

(22) Filed: Dec. 3, 2003

(65) Prior Publication Data

US 2004/0109204 A1   Jun. 10, 2004

(30) Foreign Application Priority Data

Dec. 6, 2002   (JP)   ............................. 2002-354708

(51) Int. Cl.
  *G06K 15/00*   (2006.01)
  *G06K 9/00*   (2006.01)
(52) U.S. Cl. ...................... 358/3.03; 358/1.9; 358/3.04; 358/3.05; 358/3.06; 358/524; 382/162; 382/166; 382/167; 382/252; 347/5; 347/6; 347/54; 347/80; 347/100
(58) Field of Classification Search ................ 358/3.03, 358/3.05, 1.9, 2.1, 3.04, 3.06, 3.08, 3.1, 3.3, 358/534, 536, 3.02, 3.14, 462, 515, 529; 382/252, 166, 167; 345/616, 89, 596, 72; 347/5, 6, 54, 74–78, 80, 100, 131, 213, 245

See application file for complete search history.

(56) References Cited

U.S. PATENT DOCUMENTS 5,142,374 A * 8/1992 Tajika et al. .................. 358/3.1

(Continued)

FOREIGN PATENT DOCUMENTS

JP   1-270456   10/1989

(Continued)

OTHER PUBLICATIONS

Niranjan Damera-Venkata & Brian L. Evans, "Adaptive Threshold Modulation for Error Diffusion Halftoning", IEEE Transactions on Image Processing, vol. 10, No. 1, Jan. 2001.*

(Continued)

*Primary Examiner*—Edward L Coles
*Assistant Examiner*—Steven Kau
(74) *Attorney, Agent, or Firm*—Fitzpatrick, Cella, Harper & Scinto

(57) ABSTRACT

An image processing apparatus executes an error diffusion process to multivalue image data consisting of a plurality of density components. A first processor executes the error diffusion process by changing at least one of a quantization threshold value and a quantization diffusion coefficient which are used for the error diffusion process based on a value of the multivalue image data of the density components or a value calculated from the multivalue image data value. A second processor executes the error diffusion process by setting the quantization threshold value and the quantization diffusion coefficient which are used for the error diffusion process into fixed values. An error diffusion processing controller controls to execute the error diffusion process to at least one color among the density components by the first processor and execute the error diffusion process to other density components by the second processor.

8 Claims, 6 Drawing Sheets

U.S. PATENT DOCUMENTS

| | | | | |
|---|---|---|---|---|
| 5,289,293 | A | 2/1994 | Kato et al. | 358/457 |
| 5,351,137 | A | 9/1994 | Kato et al. | 358/457 |
| 5,406,392 | A * | 4/1995 | Aoki et al. | 358/502 |
| 5,565,994 | A | 10/1996 | Eschbach | |
| 5,661,570 | A | 8/1997 | Nomura | 358/456 |
| 5,668,638 | A * | 9/1997 | Knox | 358/3.1 |
| 5,708,728 | A * | 1/1998 | Nomura | 382/162 |
| 5,949,965 | A | 9/1999 | Gondek | 395/109 |
| 5,973,803 | A | 10/1999 | Cheung et al. | 358/534 |
| 6,068,361 | A * | 5/2000 | Mantell | 347/15 |
| 6,148,031 | A | 11/2000 | Kato | 375/240.13 |
| 6,188,492 | B1 | 2/2001 | Bungo et al. | 358/486 |
| 6,328,404 | B1 * | 12/2001 | Fujimori | 347/15 |
| 6,356,363 | B1 * | 3/2002 | Cooper et al. | 358/1.9 |
| 6,542,642 | B2 | 4/2003 | Takizawa et al. | 382/236 |
| 6,614,556 | B1 * | 9/2003 | Hong et al. | 358/3.03 |
| 6,642,031 | B2 * | 11/2003 | Weyler et al. | 435/71.1 |
| 6,643,031 | B1 * | 11/2003 | Takano et al. | 358/1.9 |
| 6,665,446 | B1 | 12/2003 | Kato | 382/251 |
| 6,738,160 | B1 | 5/2004 | Kato et al. | 358/1.9 |
| 6,813,043 | B1 * | 11/2004 | Mizuyama et al. | 358/3.03 |
| 6,917,446 | B2 * | 7/2005 | Tanaka et al. | 358/1.9 |
| 6,943,918 | B1 * | 9/2005 | Kakutani | 358/3.02 |
| 7,064,869 | B2 * | 6/2006 | Spaulding et al. | 358/3.1 |
| 7,099,045 | B2 * | 8/2006 | Nabeshima | 358/2.1 |
| 2001/0019632 | A1 * | 9/2001 | Shibaki et al. | 382/252 |
| 2002/0097456 | A1 | 7/2002 | Yamada et al. | 358/536 |
| 2003/0174345 | A1 | 9/2003 | Kato et al. | 358/1.2 |
| 2003/0174352 | A1 | 9/2003 | Yamada et al. | 358/1.9 |

FOREIGN PATENT DOCUMENTS

| | | |
|---|---|---|
| JP | 3-241972 | 10/1991 |
| JP | 6-205220 | 7/1994 |
| JP | 8-46784 | 2/1996 |
| JP | 8-223422 | 8/1996 |
| JP | 8-279920 | 10/1996 |
| JP | 8-307680 | 11/1996 |
| JP | 9-139841 | 5/1997 |
| JP | 10-20074 | 7/1998 |
| JP | 11-10918 | 1/1999 |
| JP | 2001-063147 | 3/2001 |
| JP | 2002-51212 | 2/2002 |
| JP | 2002-171407 | 6/2002 |

OTHER PUBLICATIONS

Knox, Keith T. & Eschbach, Reiner, "Threshold Modulation in Error Diffusion", 1993 SPIE, The International Society for Optical Engineering.*

R. Floyd et al., "An Adaptive Algorithm for Spatial Grayscale", SID Symposium Digest of Paper, pp. 36-37, (1975).

* cited by examiner

IMAGE PROCESSING APPARATUS AND METHOD FOR EXECUTING A PROCESS OF ERROR DIFFUSION

BACKGROUND OF THE INVENTION

1. Field of the Invention

The invention relates to a data process of an image processing apparatus for executing an error diffusion process to multivalue image data comprising a plurality of density components and outputting a result of the error diffusion process.

2. Related Background Art

Hitherto, a recording apparatus which can record an image onto recording paper on the basis of image data processed by such a kind of image processing apparatus has been proposed.

As recording elements of such a recording apparatus, various recording elements according to recording systems can be used. For example, in the case of an ink jet recording system, an ink jet recording element serving as a nozzle for emitting ink from an ink emitting port can be used. In the case of the ink jet recording system, not only the recording ink can be emitted, a picture quality improver for making a color material in the recording ink insoluble or aggregating it can be also emitted.

As an image process in the image processing apparatus as mentioned above, a quantization image process for quantizing multivalue gradation data by an error diffusion method in accordance with various methods is executed.

For example, in the image processing apparatus to execute the quantization image process for quantizing the multivalue gradation data by the error diffusion method, in the recording apparatus to which the image processing apparatus can be applied, when the inputted multigradation data is outputted to an imaging apparatus which can express it only by two gradations of 0 and 1 or by gradations of the number which is smaller than the number of gradations of the input data, the data is falsely expressed by a gradation halftone process.

As a method by which density characteristics of an inputted image can be maintained and high picture quality can be obtained, an error diffusion method (refer to a literature (Loyd. R. W. and L. Steinberg, "Adoptive Algorithm for Spatial Greyscale,", SID Int. Sym., Digest of Tech Papers, 36, 37, 1975)) has been known.

According to such a method, a density difference between a pixel density of the input side and a pixel density of the output side which is outputted as a result of a comparison between the pixel density of the input side and a threshold value (such a threshold value is hereinafter called a quantization threshold value) is calculated. A specific weight is added to such a density difference and, thereafter, the resultant density difference is distributed to neighboring pixels. A value of such a weight (for every pixel) to the neighboring pixels or a set of such values is hereinafter called an error diffusion coefficient. By executing such a pseudo gradation expressing process as mentioned above, substantial resolution of the image which is outputted does not deteriorate but the image can be outputted at high quality.

In association with the realization of high performance of recent PCs (personal computers), as methods of improving the error diffusion method and realizing the higher picture quality, the methods disclosed in JP-A-H10-200724, JP-A-2002-51212, JP-A-H8-46784, JP-A-H8-307680, and the like can be mentioned. Those prior arts are mainly classified into the following two kinds of processes.

1) As a process regarding modulation of the error diffusion coefficient, there is a method disclosed in JP-A-H10-200724. The method is characterized in that when a value of an input signal indicates a highlight image, the error diffusion coefficient whose weight in the main scanning direction is large is used, that is, the error diffusion coefficient different from that of a normal image portion is used for a highlight image portion.

In JP-A-2002-51212, the error diffusion coefficient is set for a value of an error which is caused at the time of quantization.

2) As a process regarding modulation of the quantization threshold value, there is a method disclosed in JP-A-H8-46784. According to the method, a binarizing process is executed on the basis of a variable threshold value determined on the basis of an input density of a target pixel. According to a technique disclosed in JP-A-H8-307680, random number noises according to the input signal are added to the threshold value.

According to the error diffusion method mentioned above, a fixed value is used as an error diffusion coefficient or a quantization threshold value. On the other hand, according to those improved error diffusion methods, the error diffusion coefficient or the threshold value is made variable in accordance with a value regarding a feature of an original image such as input data, quantization error, or the like.

By those methods, reduction in (1) delay of dot appearance in the highlight portion and (2) occurrence of a periodic dot pattern at a specific gradation which became the problems in the error diffusion method mentioned above is realized. A large effect of improvement of the picture quality is obtained particularly with respect to the delay of the dot appearance in the highlight portion and occurrence of a dot chain pattern.

Hereinbelow, the error diffusion method regarding the above process 1) is called a diffusion coefficient modulation type error diffusion method and the error diffusion method regarding the above process 2) is called a threshold value modulation type error diffusion method. The inherent error diffusion method whereby the modulation of the diffusion coefficient is not executed is called a diffusion coefficient fixed type error diffusion method for convenience and the error diffusion method whereby the modulation of the threshold value is not executed is called a threshold value fixed type error diffusion method for convenience.

In recent years, the ordinary user can handle digital data of high picture quality in association with the spread of PCs of high performance and digital cameras of high precision. Consequently, a print of higher picture quality than the conventional one has been realized by using an ink jet recording apparatus or the like. It is forecasted that a demand for realizing the even higher picture quality increases in the future. Techniques to realize the high picture quality as mentioned above will become more and more important.

Meanwhile, in recent years, a demand for recording digital image data onto a medium such as paper or the like without using the PC is also increasing. First, a "WebTV" (registered trademark) system and a system such as "SetTopBox" or the like in which an Internet function is annexed to an ordinary television can be mentioned as systems which make the Internet use handy and easy. A demand for printing out the digital image data by what is called a (Non-PC) system which does not use the PC is also increasing.

In association with the spread of the digital cameras, a product which directly reads out stored data of the digital camera from a card throttle provided for a printer main body via a recording medium such as a compact flash (registered trademark) (CF) card or the like and directly performs printing without an intervention of a host PC has been realized.

Further, a product which can execute a direct printing process such that image data of the digital camera or the like is directly transmitted to the printer side by using a communication form of a universal serial bus (USB) or the like without an intervention of the recording medium such as a CF card or the like and recorded has also been realized.

In the invention, those products are called photodirect printers and a technique for realizing those functions is called a photodirect printing technique hereinbelow.

According to those photodirect printers, a controller unit to control the printer is provided in the printer and an image processing unit to execute predetermined processes to an image is also provided in the printer. The photodirect printers are generally constructed so that processes such as rendering, rasterization, color conversion, quantization, generation of a command to control the printing, and the like of the image which are executed on the host PC side in the conventional printers are executed by the image processing unit and the formed data is sent to a printer engine unit.

The printer engine unit reads out the formed data and interprets the print control command and the print data as necessary. The printer engine unit makes mechanical control such as paper feed, carriage movement, and the like which are necessary for recording the image onto an actual non-recording medium and also makes control such as applying of a recording head drive pulse, transmission of the data to a recording head, and the like.

Those controls which are made by the printer engine unit are substantially the same as those which are made when the printer engine unit receives data from the conventional host PC.

Recently, in association with the realization of the high performance of the PCs, a printer driver has been designed so that its processes on the PC are executed in a manner such that a high enough processing speed and high enough picture quality can be realized in an environment such that the PC has a memory of a large enough storing capacity of a unit of tens of megabytes and a high-speed CPU of a GHz unit.

In the Non-PC system or photodirect printer system whose demand has been increased in recent years as mentioned above, the memory of the large enough storing capacity and the high-speed CPU are not always provided for the image processes. In fact, in the Non-PC system or photodirect printer system which has been produced as a product in the market, a printing ability, particularly, speed performance of the printer engine unit cannot be effectively used due to a cause of a processing load in the controller unit.

In such an environment, in the case of using the various improved error diffusion methods mentioned above, there are the following problems.

First, if the processes of the printer driver which are executed on the PC with performance higher than that of the specification of a printer controller are executed as they are in the controller unit of the photodirect printer, a load of the image processing unit increases. Thus, a image recording speed deteriorates.

Particularly, the processing load in an error diffusion processing unit in the whole image process in the printer is generally equal to 30 to 50%. Further, the more the processing load in the various improved error diffusion methods increases, the more an influence on the whole system increases.

For example, in the technique disclosed in JP-A-10-200724 mentioned above, it is necessary that the gradation distributing unit certainly makes the discrimination about the highlight portion. Since those processes are executed to the whole inputted image, the load of the discriminating process directly influences the performance of the whole printer.

Also in the other error diffusion method mentioned above, since a process to change parameters every processing pixel is necessary, the load also increases.

In recent color ink jet printers, there are many such products in which the recording is executed by using not only the ink of four colors of C (cyan), M (magenta), Y (yellow), and K (black) but also the ink of colors of C (cyan) for a low density, M (magenta) for a low density, R (red), G (green), and B (blue) or the recording is executed by selectively using different liquid droplet amounts even in the case of the ink of the same color. With respect to those colors as well, quantization is executed separately from that for four fundamental colors of CMYK and an image is formed.

However, the concept of the colors is not disclosed in the Official Gazettes disclosing the foregoing diffusion coefficient modulation type error diffusion method and the threshold value modulation type error diffusion method mentioned above. That is, a concept that a proper data process is executed in accordance with a component such as color, liquid droplet type, or the like to be quantized (hereinafter, such a component is referred to as a quantization component or a density component) is not presumed. Naturally, a situation such that if the error diffusion process is executed without considering those components, a processing efficiency of the print data deteriorates, a print result of high picture quality cannot be obtained at a high speed, and the like is considered.

SUMMARY OF THE INVENTION

The invention relates to an image processing apparatus for executing an error diffusion process to multivalue image data consisting of a plurality of density components and this apparatus comprises: first processing means for executing the error diffusion process by changing at least one of a quantization threshold value and a quantization diffusion coefficient which are used for the error diffusion process on the basis of a value of the multivalue image data of the density components or a value calculated from the multivalue image data value; second processing means for executing the error diffusion process by setting the quantization threshold value and the quantization diffusion coefficient which are used for the error diffusion process into fixed values; and error diffusion processing control means for making control to execute the error diffusion process to at least one color among the plurality of density components by the first processing means and execute the error diffusion process to other density components by the second processing means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Embodiments of the invention will be described hereinbelow with reference to the drawings.

First Embodiment

Figure 1:
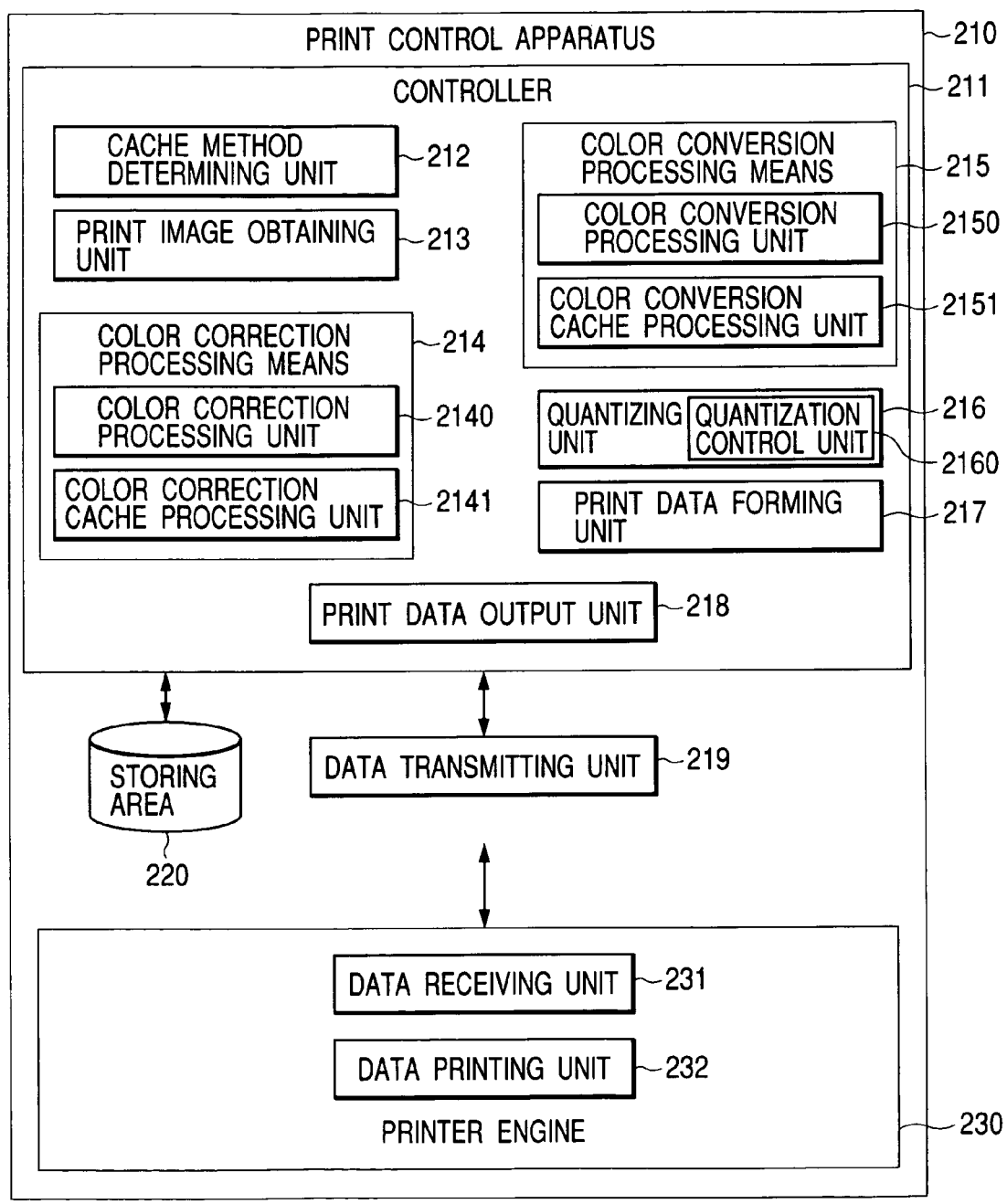
FIG. 1 is a diagram for explaining a construction of a printing apparatus to which an image processing apparatus showing the first embodiment of the invention can be applied.

FIG. 1 is a diagram for explaining a construction of a printing apparatus to which an image processing apparatus showing the first embodiment of the invention can be applied. Although a case of using an ink jet printer as a printing apparatus will be described here, the invention can be applied to any type of image forming system such as ink jet system, electrophotographic system, thermal transfer system, or the like.

A controller 211, a data transmitting unit 219, a storing area 220, and the like exist in a print control apparatus 210 shown in FIG. 1.

A cache method determining unit 212, a print image obtaining unit 213, color correction processing means 214, color conversion processing means 215, a quantizing unit 216, and a print data forming unit 217 exist in the controller 211.

A printer engine 230 is constructed by a data receiving unit 231, a data printing unit 232 having an ink jet head which can emit ink droplets of, for example, six colors, and the like. The print control apparatus 210 and the printer engine 230 are connected by an interface.

A color correction processing unit 2140 and a color correction cache processing unit 2141 exist in the color correction processing means 214. A color conversion processing unit 2150 and a color conversion cache processing unit 2151 exist in the color conversion processing means 215.

The above construction will be described in detail hereinbelow. First, in controller 211, whether a cache for a color process and a color conversion is used or not is determined as a pre-process by the cache method determining unit 212, which will be explained hereinlater.

When an actual printing process is started, an image serving as a print target is obtained by the print image obtaining unit 213 and the color correction processing means 214 is executed to the obtained image. The color correction processing means 214 is constructed by the color correction processing unit 2140 and the color correction cache processing unit 2141. When a color correction cache is invalid or even if it is valid, if the target pixel is not cached, a color correcting process is executed.

The color conversion processing means 215 is constructed by the color conversion processing unit 2150 and the color conversion cache processing unit 2151. Processes are executed in a manner similar to the case of the color correction. The data which passed through the color conversion processing unit 2150 is subjected to an error diffusion process and a dither process by the quantizing unit 216 and converted into quantized data that can be handled by the printer. The print data forming unit 217 converts the quantized data into printer print data and transmits it to the printer via a print data output unit 218.

In the color correction cache processing unit 2141 and the color conversion cache processing unit 2151, a cache table, which will be explained hereinlater, is stored in the storing area 220 and used.

The data receiving unit 231 in the printer engine 230 receives the data transmitted from the data transmitting unit 219 in the print control apparatus 210 and prints by using the data printing unit 232. The operating processes in the hardware regarding the print control apparatus has been described in detail above.

The image processing apparatus (example in which the invention is applied to the print control apparatus in FIG. 1) constructed as mentioned above is an image processing apparatus for executing the error diffusion process to multivalue image data consisting of a plurality of density components and outputting a result of the error diffusion process.

The data forming method by the quantizing unit 216 shown in FIG. 1 will be described with reference to FIGS. 2, 3, and the like.

In the embodiment, an example in which the data printing unit 232 of the printer engine 230 records and processes the image data by liquid droplets of cyan (sC) and magenta (sM) of small liquid droplet amounts in addition to liquid droplets of black (K), cyan (C), magenta (M), and yellow (Y) of ordinary liquid droplet amounts is used. This means that there are six kinds (corresponding to the number of colors of inks of the ink jet head) of quantization components to be quantized every color.

A schematic procedure of the actual image processes is as follows.

First, before the data is sent to the quantizing unit 216, the color converting unit executes a conversion (RGB→R'G'B') for matching a color gamut RGB in a data format of an original image (for example, RGB) with a color gamut R'G'B' which can be outputted by the printer.

After that, the converted color gamut R'G'B' is converted into an output level value of each recording component (K, C, M, Y, sC, sM) in the printer.

The data of the output level value is transferred to the quantizing unit 216 every quantization component.

Figure 2:
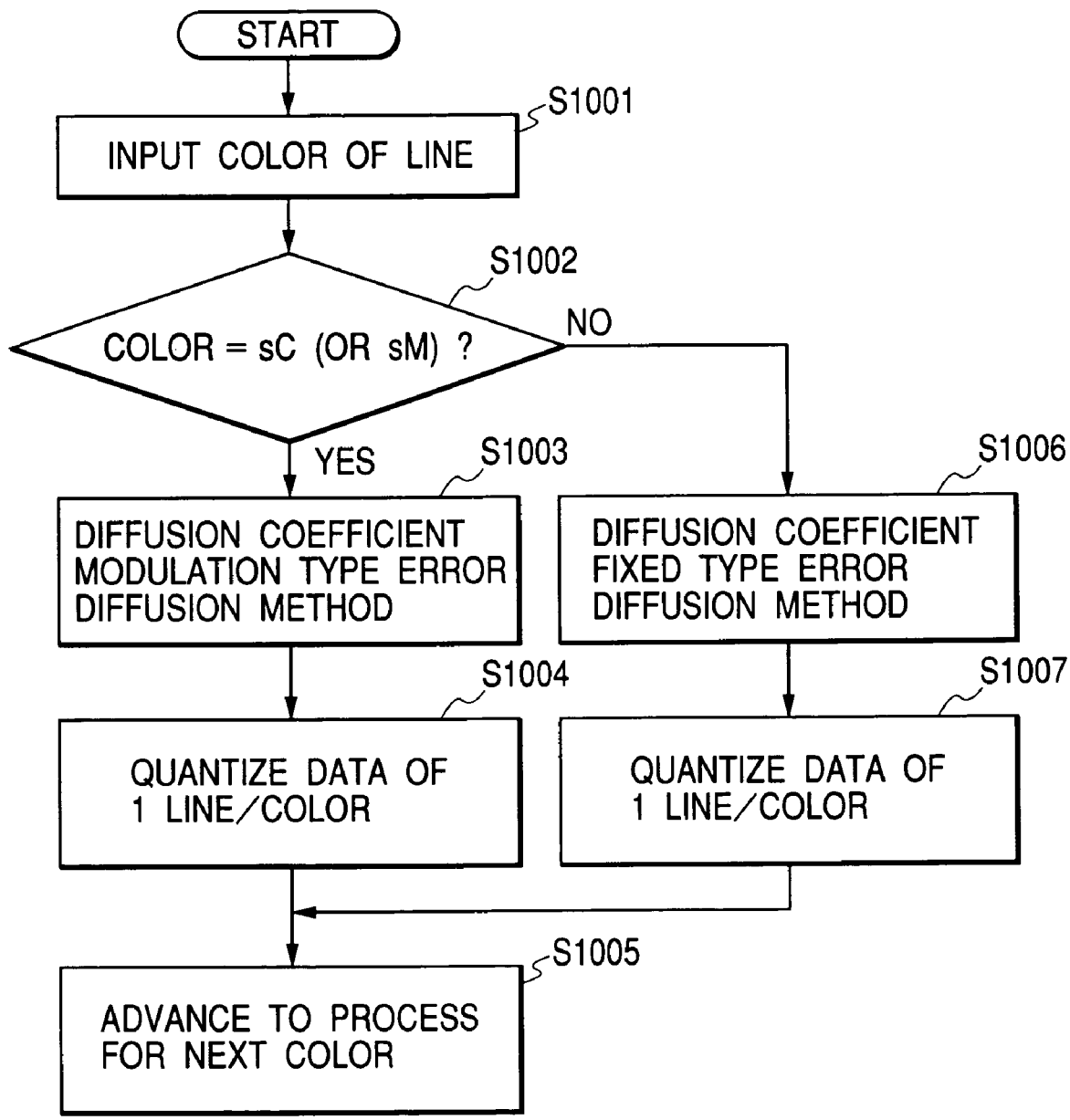
FIG. 2 is a flowchart showing an example of a first data processing procedure in the image processing apparatus according to the invention.

FIG. 2 is a flowchart showing an example of the first data processing procedure in the image processing apparatus according to the invention. This process is executed by the quantizing unit 216 shown in FIG. 1. S1001 to S1007 denote processing steps, respectively.

First, a color component of the relevant line to be quantized is inputted (step S1001).

What is the quantization component of the relevant line is discriminated (step S1002). If the quantization component of the relevant line is sC (or sM), step S1003 follows and the diffusion coefficient modulation type error diffusion process is executed.

In this case, it is assumed that the error diffusion coefficient of the highlight portion is set to a ratio different from that of the error diffusion coefficient of the normal portion.

The data of the relevant quantization component of one line is formed (step S1004). After that, the processing routine advances to the process for the next color (step S1005).

If a result of the discrimination in step S1002 does not indicate sC or sM, step S1006 follows and a diffusion coefficient fixed type error diffusion process is executed to the quantization component. The data of the relevant quantization component of one line is formed in step S1007 and the processing routine advances to the process for the next color. When the processes of all colors of the relevant line are finished, the processing routine advances to the process for the next line in step S1005.

Subsequently, effects of the present construction will be described.

As already mentioned above, when the diffusion coefficient modulation type error diffusion method is compared with the fixed type error diffusion method, since a processing load of the diffusion coefficient fixed type error diffusion method is smaller than that of the former method, a processing speed is naturally higher.

In the embodiment, in the case of selecting one of a plurality of error diffusion processes, the comparison is made every line on a quantization component unit basis. Thus, the processing load can be lightened as compared with that in the case of performing the diffusion coefficient modulation to the whole quantization component.

Subsequently, differences of the picture quality are compared. Explanation will be made with respect to an example of the cyan ink (C) of a large liquid droplet.

In the case of considering only a dot layout of the cyan ink, naturally, an image obtained by performing the diffusion coefficient modulating process is better.

However, a case of expressing the actual image will be presumed as follows.

Figure 3:
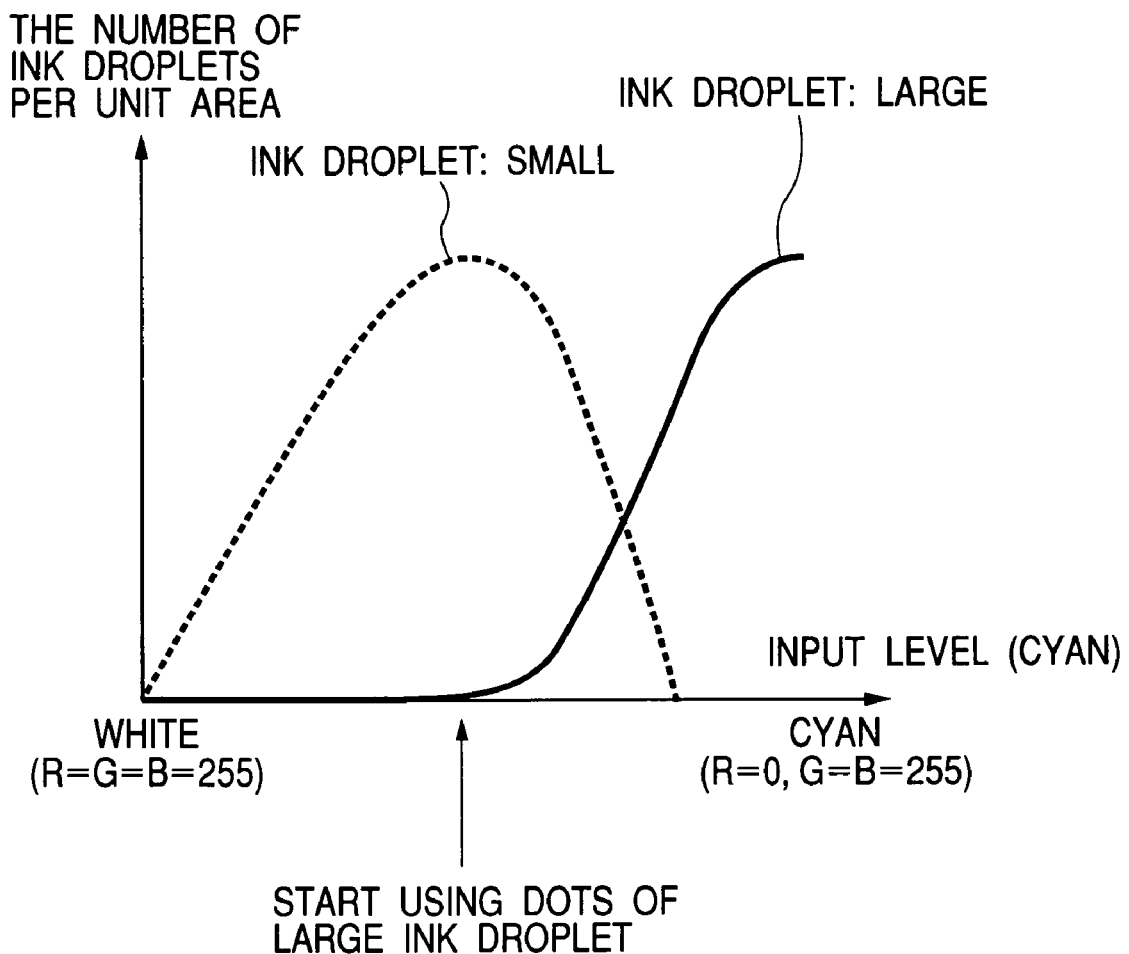
FIG. 3 is a diagram for explaining a relation between input image data and the number of ink droplets in the image processing apparatus according to the invention.

For example, in the case of expressing gradations in a range from white to the highest density of cyan, as shown in FIG. 3, the apparatus is designed so that the image is formed only by the cyan ink (sC) of the small liquid droplet on the highlight side and, after the density reaches a certain extent, the cyan ink (C) of the large liquid droplet is used.

Therefore, a density at the time when use of the cyan ink of the actual large liquid droplet is started is not equal to a value in the highlight portion of the original image but is equal to a value near a halftone of the original image in which the sufficient cyan ink of the small liquid droplet has already existed.

That is, in the real image, the dots in the use start portion of the cyan ink is inconspicuous. In other words, even if the diffusion coefficient modulating process is not performed, a better image can be obtained.

As mentioned above, by using the quantizing method of the invention, comparing the process in the embodiment with executing the diffusion coefficient modulating process to all of the quantization components, the better image can be formed while lightening the load of the quantizing process.

Although the embodiment has been described with respect to the case of the cyan ink of the liquid droplets of the different sizes, the intention of the invention is not limited to such a combination. The invention can be adapted to a plurality of quantization components whose highest densities which can be expressed in a similar color are different.

At this time, the error diffusion process of the diffusion coefficient modulation type is executed to the quantization component whose highest density which can be expressed is relatively low and the error diffusion process of the diffusion coefficient fixed type is executed to the quantization component whose highest density which can be expressed is relatively high.

Thus, the processing load can be reduced more and the better image can be maintained than those in the case of performing the diffusion coefficient modulation type error diffusion process to both of the quantization components.

As a combination of a plurality of quantization components whose highest densities which can be expressed are different, in addition to the difference between the sizes of the ink droplets mentioned above, there is a case where densities of dyes in the ink are different. The invention can be applied to such a condition. The invention can be also applied to a case of a combination of both of the difference between the sizes of the ink droplets and the difference between the densities of the dyes in the ink. Also in those cases, similar effects can be obtained by executing the error diffusion process of the diffusion coefficient modulation type to the quantization component whose highest density which can be expressed is relatively low and executing the error diffusion process of the diffusion coefficient fixed type to the other quantization component.

The embodiment has been described with respect to the case where the sizes of ink droplets are different at two levels. However, the invention can be also applied to the case where the quantization components of a similar color are different at three or more levels due to the difference among the sizes of the ink droplets or the densities of the dyes in the ink or a combination of them. In such a case, it is desirable to execute the diffusion coefficient modulation type error diffusion process to the quantization components from the quantization component whose highest density which can be expressed is lower.

For example, it is also possible to use a form in which when the sizes of the ink droplets are different at three levels and they are the different quantization components, the diffusion coefficient modulation type error diffusion process is executed only to the quantization component of the smallest liquid droplet. It is also possible to use a form in which the diffusion coefficient modulation type error diffusion process is executed to both of the quantization component of the smallest liquid droplet and the quantization component of the second smallest liquid droplet.

That is, it is sufficient to execute the diffusion coefficient modulation type error diffusion process to the component whose highest density which can be expressed is relatively low and execute the diffusion coefficient fixed type error diffusion process to the component whose highest density which can be expressed is relatively high.

Naturally, the diffusion coefficient modulation type error diffusion process which is used in the embodiment is not limited to those mentioned in the foregoing prior arts but incorporates all error diffusion processes of the diffusion coefficient modulation type other than the processes using the fixed diffusion coefficients.

Second Embodiment

Subsequently, the second embodiment will be described with reference to FIG. 4. Although the first embodiment has been shown and described with respect to the diffusion coefficient modulation type error diffusion process, a processing method in the case of a threshold value modulation type error diffusion process is shown in the second embodiment.

Figure 4:
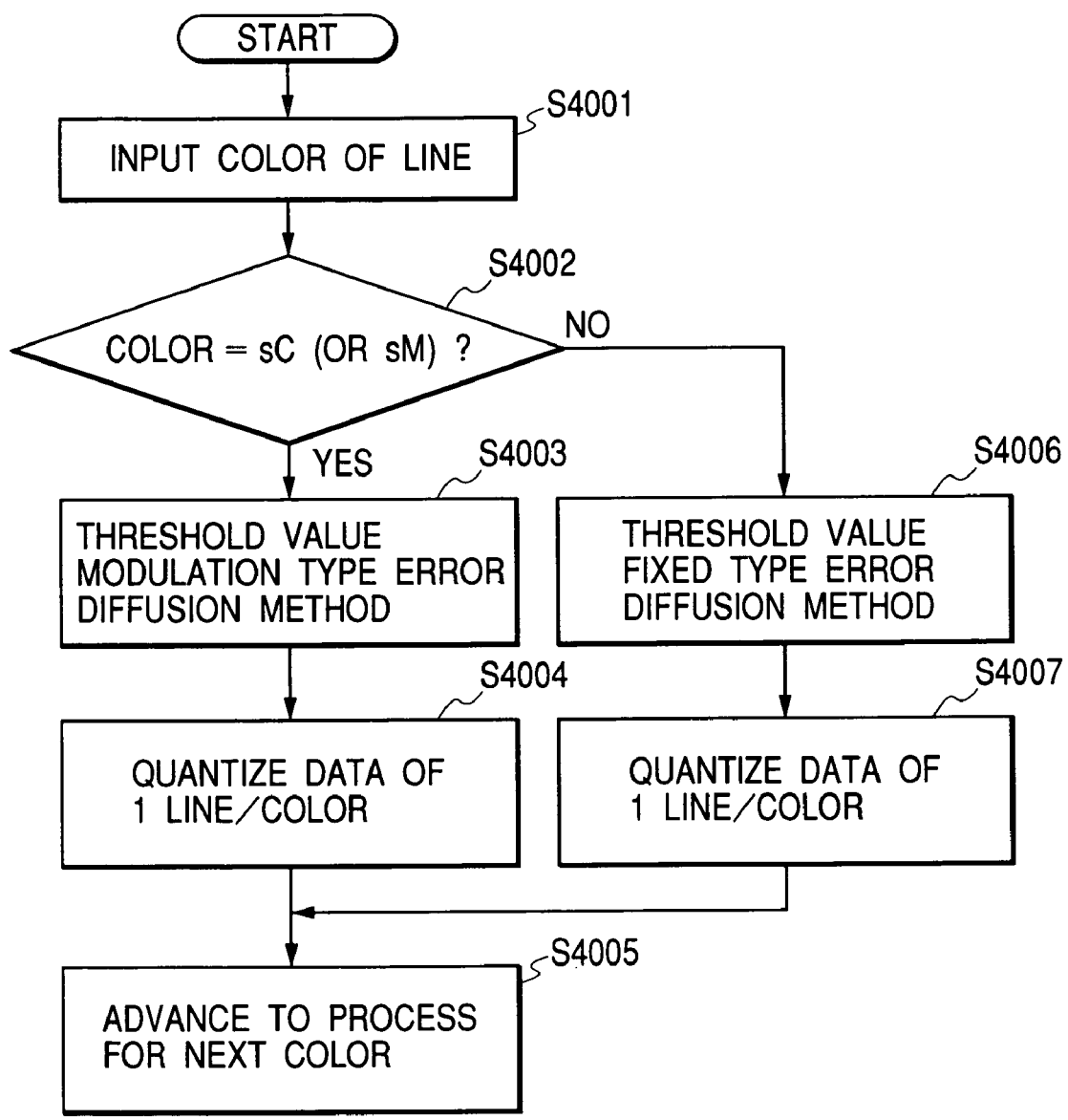
FIG. 4 is a flowchart showing an example of a second data processing procedure in the image processing apparatus according to the invention.

FIG. 4 is a flowchart showing an example of the second data processing procedure in the image processing apparatus according to the invention. The processes are executed by the quantizing unit 216 shown in FIG. 1. S4001 to S4007 denote processing steps, respectively.

First, the color component of the relevant line to be quantized is inputted to the quantizing unit 216 (step S4001).

Subsequently, the quantization component of the relevant line is discriminated (step S4002). If it is determined that the quantization component of the relevant line is sC (or sM), step S4003 follows and the threshold value modulation type error diffusion process is executed.

According to the threshold value modulation type error diffusion process, for example, a quantizing process is executed by using a variable threshold value determined on the basis of an input density of a target pixel.

Data of the relevant quantization component of one line is formed (step S4004). When the data creation is finished, the processing routine advances to the process for the next color (step S4005).

If it is determined that the discrimination result in step S4002 is not sC (or sM), step S4006 follows and the threshold value fixed type error diffusion process is executed to the quantization component.

Data of the quantization component of one line is formed (step S4007) and the processing routine advances to the next color.

After completion of the processes for all colors of the relevant line, step S4005 follows and the process for the next line is executed.

In a manner similar to the case of the first embodiment, when the threshold value modulation type error diffusion process and the threshold value fixed type error diffusion process are compared, a processing speed of the threshold value fixed type error diffusion process is higher because the load of the threshold value fixed type error diffusion process is smaller than that of the threshold value modulation type error diffusion process.

In the embodiment, in the case of selecting one of a plurality of error diffusion processes, the comparison of the quantization component unit is performed every line and the threshold value modulation is not performed to all of the quantization components but the threshold value modulation type error diffusion process is executed only to a predetermined color. Thus, the load of the quantizing process can be lightened.

Further, also in terms of the picture quality, as already described in the foregoing embodiment, the apparatus is designed so that the image is formed on the highlight side only by the cyan ink (sC) of the small liquid droplet and, after the density reaches a certain extent, the cyan ink (C) of the large liquid droplet is used as shown in FIG. 3. Therefore, the density of the cyan ink of the actual large liquid droplet at the time of starting to use it is not a value in the highlight portion of the original image but becomes a value near the halftone in which a sufficient amount of cyan ink of the small liquid droplet has already existed. In the actual image, consequently, the dots at the density at timing near the start of the use of the cyan ink (C) are inconspicuous. Even if a slight delay of dot appearance occurs, a good image without noises and graininess can be obtained.

By using the quantizing method according to the second embodiment as mentioned above, the better image can be formed while lightening the load of the quantizing process as compared with the case of performing the threshold value modulation type error diffusion process to all of the quantization components.

Although the second embodiment has been described with respect to the case of using the cyan inks in which the sizes of liquid droplets are different at two kinds in a manner similar to the case of the first embodiment, the intention of the invention is not limited to such a combination.

Further, naturally, the invention can be applied to the case of simultaneously using the diffusion coefficient modulation type error diffusion process and the threshold value modulation type error diffusion process.

Third Embodiment

The third embodiment will now be described. The embodiment will be explained with respect to the case of applying the invention to a correlation type error diffusion process for a plurality of quantization components.

The correlation type error diffusion process for a plurality of quantization components relates to the techniques disclosed in JP-A-H8-279920, JP-A-H11-10918, JP-A-H9-139841, JP-A-2002-171407, and the like and relates to a processing method whereby in order to reduce, particularly, graininess of a middle density area of a color image, an image is formed so that the dots of the cyan (C) component and the magenta (M) component do not overlap mutually. That is, it relates to a method whereby when one of those components is quantized, a value (input value, output value, quantization error, etc.) regarding the quantization of the other component is reflected and the error diffusion process is executed.

The quantization components to be quantized are four colors of cyan (C), magenta (M), yellow (Y), and black (K).

Figure 5:
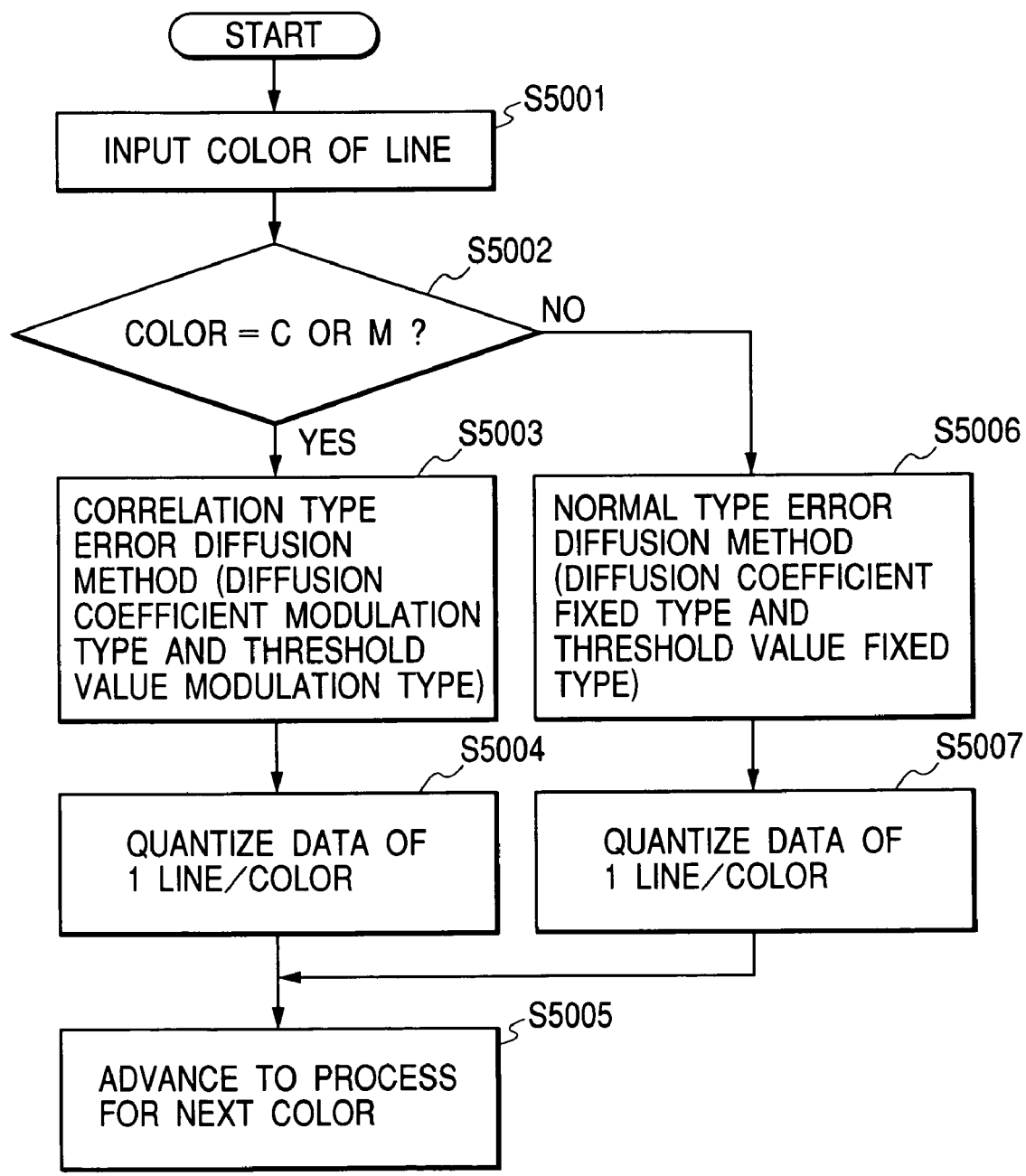
FIG. 5 is a flowchart showing an example of a third data processing procedure in the image processing apparatus according to the invention.

FIG. 5 is a flowchart showing an example of a third data processing procedure in the image processing apparatus according to the invention. The processes in this procedure are executed by the quantizing unit 216 shown in FIG. 1. S5001 to S5007 denote processing steps, respectively.

First, the color component of the relevant line to be quantized is inputted to the quantizing unit 216 (step S5001).

Subsequently, the quantization component of the relevant line is discriminated (step S5002). If it is determined that the quantization component of the relevant line is C or M, step S5003 follows and the correlation type error diffusion process is executed.

The diffusion coefficient modulation type error diffusion process and the threshold value modulation type error diffusion process have been implemented in a function of the correlation type error diffusion process and each effect has been reflected to a quantization result.

Unlike the case of the foregoing embodiments, as parameters such as actual diffusion coefficient, threshold value, and the like, it is more desirable to use parameters which have been optimized to the correlation type error diffusion process.

Data of the quantization component of one line is formed (step S5004) and the processing routine advances to the next color.

If it is determined in step S5002 that the quantization component is neither C nor M, step S5006 follows. In step S5006, the normal error diffusion processes, that is, the diffusion coefficient fixed type error diffusion process and the threshold value fixed type error diffusion process are executed to the quantization component.

Subsequently, the data of the quantization component of one line is formed (step S5007) and the processing routine advances to the next color. After completion of the quantization for all of the colors of the relevant line, step S5005 follows and the processing routine advances to the next line.

The quantization components to which the correlation type error diffusion process is applied are adapted to an area in a range from the low density to a value near the middle density and to the cyan ink and the magenta ink in which the graininess is visually conspicuous. They are not applied to the yellow ink whose graininess is relatively low and the black ink which is used in the high density portion (this is because with respect to the low density portion, the graininess is lightened by expressing it by mixing the cyan ink, magenta ink, and yellow ink).

Similarly, by performing the diffusion coefficient modulation type error diffusion process and the threshold value modulation type error diffusion process to an area in a range from the low density to a value near the middle density and only to the cyan ink and the magenta ink in which the graininess is visually conspicuous, a better image can be obtained as compared with the case of executing the normal correlation type error diffusion process. The load of the quantizing process can be lightened by performing the normal error diffusion process to yellow and black.

Although the third embodiment has been described with respect to the case of applying both of the diffusion coefficient modulation type error diffusion process and the threshold value modulation type error diffusion process, the effects of the invention can be obtained even by applying either of them in a manner similar to the cases of the first and second embodiments mentioned above.

Although the cyan (C) and magenta (M) have been used as quantization components to which the correlation type error diffusion process is applied in the third embodiment, the invention is not limited to such an example. That is, the quantization components to which the correlation type error diffusion process is applied are matched with the quantization components to which (both or either of) the diffusion coefficient modulation type error diffusion process and the threshold value modulation type error diffusion process are applied and the diffusion coefficient fixed type error diffusion process and the threshold value fixed type error diffusion process are executed to other quantization components.

Thus, the better image can be obtained while lightening the load of the quantizing process as compared with the case of applying both or either of the diffusion coefficient modulation type error diffusion process and the threshold value modulation type error diffusion process to all of the quantization components.

A construction of data processing programs which can be read out by the image processing apparatus according to the invention will be described hereinbelow with reference to a memory map shown in FIG. 6.

Figure 6:
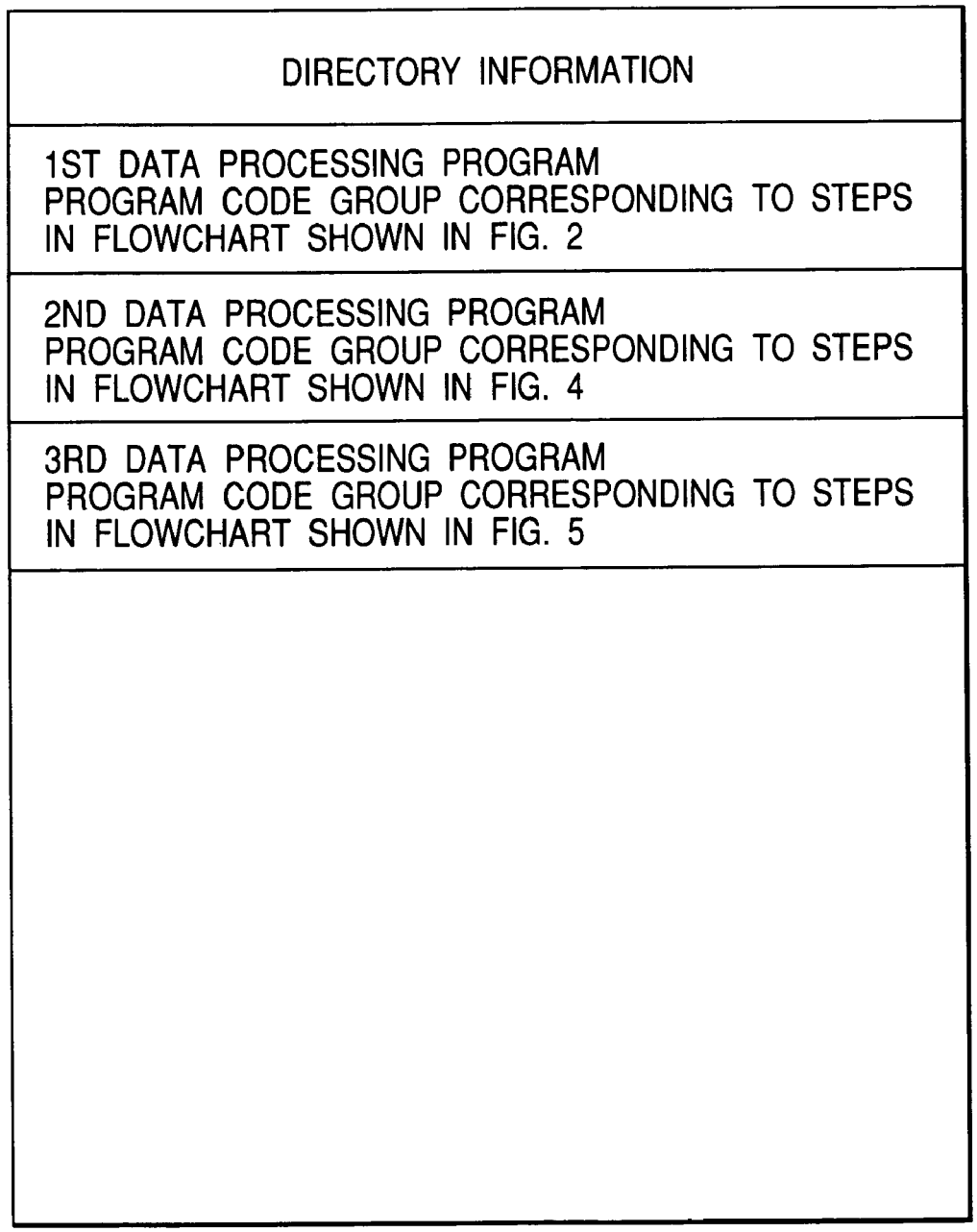
FIG. 6 is a diagram for explaining a memory map of a storing medium for storing various data processing programs which can be read out by the image processing apparatus according to the invention.

FIG. 6 is a diagram for explaining the memory map of a storing medium for storing various data processing programs which can be read out by the image processing apparatus according to the invention.

Although not particularly shown, information to manage a program group which is stored into the storing medium, for example, version information, implementors, and the like are also stored. There is also a case where information which depends on the OS or the like on the program reading side, for example, icons or the like for identifying and displaying the programs are also stored.

Further, data which depends on the various programs is also managed in the directory. There is also a case where a program to install the various programs into a computer or, if the installing program has been compressed, a program for decompressing it or the like is also stored.

The functions shown in FIGS. 2, 4, and 5 in the embodiments can be executed by a host computer on the basis of a program which is installed from the outside. In such a case, the invention is also applied to a case where an information group including the programs is supplied to an output apparatus by a storing medium such as CD-ROM, flash memory, FD, or the like or from an external storing medium via a network.

Naturally, the objects of the invention are accomplished by a method whereby the storing medium in which program codes of software to realize the foregoing functions of the embodiments have been recorded as mentioned above is supplied to a system or an apparatus and a computer (or a CPU or an MPU) of the system or the apparatus reads out the program codes stored in the storing medium and executes them.

In this case, the program codes themselves read out from the storing medium realize the novel functions of the invention. The storing medium in which the program codes have been stored constructs the invention.

As a storing medium to supply the program codes, for example, a flexible disk, a hard disk, an optical disk, a magnetooptic disk, a CD-ROM, a CD-R, a magnetic tape, a non-volatile memory card, a ROM, an EEPROM, or the like can be used.

Naturally, the invention incorporates not only a case where a computer executes the read-out program codes, so that the foregoing functions of the embodiments are realized but also a case where an OS (Operating System) or the like which is operating on the computer executes a part or all of actual processes on the basis of instructions of the program codes and the foregoing functions of the embodiments are realized by those processes.

Further, naturally, the invention incorporates a case where the program codes read out from the storing medium are written into a memory provided for a function expanding board inserted in a computer or a function expanding unit connected to a computer and, thereafter, a CPU or the like provided for the function expanding board or the function expanding unit executes a part or all of actual processes on the basis of instructions of the program codes and the foregoing functions of the embodiments are realized by those processes.

Although the foregoing embodiments have been described with respect to the construction in which the processes are realized by the software for the sake of convenience, the intention of the invention is not limited to such an example. They can be also realized by hardware. In addition to the above effects, a new effect such that as compared with the case of realizing the prior arts by hardware as it is, they can be realized by hardware of a small scale and it is possible to contribute to the reduction in costs of the whole system can be also obtained.

The invention is not limited to the foregoing embodiments but various modifications (including organic combinations of the embodiments) are possible on the basis of the spirit of the invention, and they are not excluded from the scope of the invention.

Although the embodiments have been described with respect to the example in which the image data is printed onto the recording paper, the invention can be also applied to image processing apparatuses in various electronic equipment using paper, cloth, leather, nonwoven fabric cloth, an OHP sheet, or the like, and further, a medium to be recorded such as metal or the like as a recording medium.

As equipment to which the image processing apparatus according to the invention can be applied, office equipment such as printer, copying apparatus, facsimile, and the like, displays such as CRT, LCD, and the like, printed matter producing equipment, and the like can be mentioned.

Although the various examples and the embodiments of the invention have been shown and described, naturally, those with ordinary skill in the art will understand that the spirit and scope of the invention are not limited to the specific explanation in the specification but other various modifications are incorporated in the invention.

According to the embodiments mentioned above, by lightening the processing load of the image processing unit, an image output in which high picture quality and speed are maintained can be provided even in an environment in which the apparatus does not have a memory of a large enough storing capacity and a high-speed CPU.

An image output in which even in various image data processing environments, a load to the main body engine unit is minimized while flexibly coping with them and high picture quality and speed are maintained can be provided. Particularly, a printer system of a reasonable price can be realized while lightening the load of the quantizing process in the photodirect printer system and minimizing the change in printer engine unit.

According to the invention as described above, there is an effect such that the optimum error diffusion process is executed without increasing the image data processing burden onto the multivalue image data which is inputted and the image data of high picture quality can be formed.

What is claimed is:

1. An image processing apparatus for executing an error diffusion process to color data having a plurality of density components including at least first and second density components, comprising:
   a processor and a memory;
   a first processing unit that modulates at least one of a quantization threshold value and a quantization diffusion coefficient on the basis of the first density component, and executes the error diffusion process to the first density component by using at least one of the modulated quantization threshold value and the modulated quantization diffusion coefficient; and
   a second processing unit that executes the error diffusion process to the second density component by using a fixed quantization threshold value and a fixed quantization diffusion coefficient, wherein the error diffusion process executed by the second processing unit requires a lighter processing load than the error diffusion process executed by the first processing unit,
   wherein a color reproduced by an image forming unit according to the first density component is similar to a color reproduced by the image forming unit according to the second density component, and
   wherein a highest density reproducible by the image forming unit according to the first density component is lower than a highest density reproducible by the image forming unit according to the second density component.

2. An image processing apparatus according to claim 1, wherein one droplet output by the image forming unit based on the first density component has a smaller size than one droplet output by the image forming unit based on the second density component.

3. An image processing apparatus according to claim 1, wherein the plurality of density components correspond to respective different colorants used in the image forming unit, and wherein a first one of the colorants corresponding to the first density component and a second one of the colorants corresponding to the second density component have similar colors and wherein the first colorant has a lower density than the second colorant.

4. An image processing apparatus according to claim 1, wherein one dot output based on the first density component has a smaller size than one dot based on the second density component.

5. An image processing method of an image processing apparatus executing an error diffusion process to color data having a plurality of density components including at least first and second density components, comprising:
   a computer executing the steps comprising:
   a first processing step of modulating at least one of a quantization threshold value and a quantization diffusion coefficient on the basis of the first density component, and executing the error diffusion process to the first density component by using at least one of the modulated quantization threshold value and the modulated quantization diffusion coefficient; and
   a second processing step of executing the error diffusion process to the second density component by using a fixed quantization threshold value and a fixed quantization diffusion coefficient, wherein the error diffusion process executed by the second processing step requires a lighter processing load than the error diffusion process executed by the first processing step,
   wherein a color reproduced by an image forming step according to the first density component is similar to a color reproduced by the image forming step according to the second density component, and
   wherein a highest density reproducible by the image forming step according to the first density component is lower than a highest density reproducible by the image forming step according to the second density component.

6. A method of an image processing apparatus according to claim 5,
   wherein one droplet output by the image forming step based on the first density component has a smaller size than one droplet output by the image forming step based on the second density component.

7. A non-transitory computer-readable storage medium on which is stored an image processing program for an image processing apparatus executing an error diffusion process to color data having a plurality of density components including at least first and second density components, wherein said program comprises:
   a first processing step of modulating at least one of a quantization threshold value and a quantization diffusion coefficient on the basis of the first density component, and executing the error diffusion process to the first density component by using at least one of the modulated quantization threshold value and the modulated quantization diffusion coefficient; and
   a second processing step of executing the error diffusion process to the second density component by using a fixed quantization threshold value and a fixed quantization diffusion coefficient, wherein the error diffusion process executed by the second processing step requires a lighter processing load than the error diffusion process executed by the first processing step,
   wherein a color reproduced by an image forming step according to the first density component is similar to a color reproduced by the image forming step according to the second density component, and
   wherein a highest density reproducible by the image forming step according to the first density component is lower than a highest density reproducible by the image forming step according to the second density component second density component.

8. A non-transitory computer-readable storage medium according to claim 7,
   wherein one droplet output by the image forming step based on the first density component has a smaller size than one droplet output by the image forming step based on the second density component.

* * * * *